(12) United States Patent
Dodson et al.

(10) Patent No.: US 7,058,767 B2
(45) Date of Patent: Jun. 6, 2006

(54) ADAPTIVE MEMORY ACCESS SPECULATION

(75) Inventors: John Steven Dodson, Pflugerville, TX (US); James Stephen Fields, Jr., Austin, TX (US); Sanjeev Ghai, Round Rock, TX (US); Jeffrey Adam Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 10/425,400

(22) Filed: Apr. 28, 2003

(65) Prior Publication Data

US 2004/0215891 A1    Oct. 28, 2004

(51) Int. Cl.
*G06F 12/00*    (2006.01)
(52) U.S. Cl. ...................... 711/137; 712/207
(58) Field of Classification Search ............... 711/137, 711/213, 217; 712/237–240
See application file for complete search history.

(56) References Cited

U.S. PATENT DOCUMENTS

| | | | | |
|---|---|---|---|---|
| 5,146,578 A | * | 9/1992 | Zangenehpour | ............. 711/137 |
| 5,263,153 A | * | 11/1993 | Intrater et al. | ................ 714/51 |
| 5,608,878 A | | 3/1997 | Arimilli et al. | |
| 6,275,909 B1 | | 8/2001 | Arimilli et al. | |
| 6,347,369 B1 | * | 2/2002 | Witt | ........................... 712/240 |
| 6,490,658 B1 | * | 12/2002 | Ahmed et al. | .............. 711/140 |
| 6,567,900 B1 | * | 5/2003 | Kessler | ....................... 711/157 |
| 6,678,795 B1 | * | 1/2004 | Moreno et al. | ............. 711/137 |
| 2002/0123041 A1 | * | 9/2002 | McMichael | ..................... 435/5 |

OTHER PUBLICATIONS

"CPC710-133 PCI Bridge and SDRAM Memory Controller", Copyright IBM Corporation 2002, All Rights Reserved, Printed in the U.S.A. Apr. 2002, www.ibm.com/powerpc.

* cited by examiner

*Primary Examiner*—Nasser Moazzami
(74) *Attorney, Agent, or Firm*—Casimer K. Salys; Dillon & Yudell LLP

(57) ABSTRACT

A method and system for speculatively pre-fetching data from a memory. A memory controller on a data bus "snoops" data requests put on the data bus by a bus control logic. Based on information in the header of the data request, such as transaction type, tag, transaction size, etc., a speculative pre-fetch is made to read data from the memory associated with the memory controller. If the speculative fetch turns out to be correct, then the memory controller makes an assumption that the pre-fetch was too conservative (non-speculative), and a pre-fetch for a next data request is performed at an earlier more speculative time. If the speculative fetch turns out to be incorrect, then the memory controller makes an assumption that the pre-fetch was too speculative (made early), and a pre-fetch for a next data request is performed at a later less speculative time.

23 Claims, 8 Drawing Sheets

ADAPTIVE MEMORY ACCESS SPECULATION

BACKGROUND OF THE INVENTION

1. Technical Field

The present invention relates in general to a field of computers, and in particular to accessing computer system memory. Still more particularly, the present invention relates to a method and system for dynamically adjusting speculative retrieval of data stored in system memory.

2. Description of the Related Art

Processors in a multi-processor computer system typically share system memory, which may be either in multiple private memories associated with specific processors, or in a centralized memory, in which memory access is the same for all processors. For example, FIG. 1 illustrates a multi-processor computer 100 utilizing a centralized memory system sometimes referred to as a "dance hall," in which processors 102 are on one "side" of a data bus 116 and system memories 114 are on the other "side" of the data bus 114. When a processor, such as processor 102a requires data from memory, it first checks its own L1 cache 104a and L2 cache 106a. If the data is not in either local cache, then a request is put out onto data bus 116, which is managed by bus arbiter 110. Cache controllers 108 "snoop" data bus 116 for requests for data that may be in their respective caches 106 or 104.

If no valid data is in any of the caches, then the data is retrieved from one of system memories 114, each being assigned a particular range of memory addresses, which are under the control of respective memory controllers 112. However, before a specific memory controller 112 accesses data from its respective system memory 114, the memory controller 112 waits until a combined response is returned to the data bus 116 by the bus arbiter 110 stating that none of the caches have the requested valid data.

Referring now to FIG. 2, a time line 200 illustrates the sequence of events in which a data request from a cache is performed. At time (1), the bus arbiter 110, in response to a query from one of the processors 102 (shown in FIG. 1), puts a data request on the data bus. At time (2), each cache controller 108 provides a "snoop" shared response, such as "retry," "busy," "valid data available," etc. The bus arbiter "collects" the shared responses, and at time (3) issues an "early combined response," which is a hint (guess) as to where the valid data is stored. That is, the bus arbiter 110 puts out an early response predicting which cache, if any, has the valid coherent data. At time (4), the bus arbiter 110 issues a "combined response," which is a final response back to the bus confirming which cache controller 108, if any, has control and access to the requested data (or else that the request will be retried due to a bus collision or other delay).

As systems become more complex, as in more processors 102 (each with a dedicated cache controller 108) being connected to the data bus 116, the delay between the data request and the final combined response becomes much longer in a non-linear manner. That is, adding twice as many processors results in a time delay that is more than twice as long between the initial data request and the final combined response. This is due in part to the super-linear amount of time required for all cache controllers 108 to snoop and respond to the data request, and for the bus arbiter 116 to evaluate all of the cache controller responses and formulate the final combined response for broadcast back to the data bus 116.

In the event that none of the cache memories 106 or 108 have the requested valid data, then the data must be retrieved from one of the system memories 114. In an effort to minimize total time delay required to retrieve the data from a system memory 114 after a cache "miss," memory controllers 112 also "snoop" data requests on the data bus 116, and speculatively pre-fetch data from their respective system memory 114 whenever the data request is for data at a memory address used by that system memory 114. That is, if a data request on data bus 116 is for data at an address used by system memory 114a, then memory controller 112a automatically speculatively pre-fetches the data at that address and stores the data in a queue in the memory controller 112a. This brute approach is highly inefficient, since many of the data requests are for data stored in cache memories, and thus an access to system memory is not needed. Automatically accessing the system memories 114 in this manner not only ties up valuable queue resources in the memory controller 112, but also consumes excessive power, which also results in the generation of excessive heat and wastes valuable power, including battery power.

Thus, there is a need for a system and method that allows memory controllers to more intelligently, and thus more accurately, predict and pre-fetch data from their associated system memories in response to a data request.

SUMMARY OF THE INVENTION

The present invention is directed to a method and system for speculatively pre-fetching data from a memory. A memory controller on a data bus "snoops" data requests put on the data bus by a bus control logic. Based on information in the header of the data request, such as transaction type, tag, transaction size, etc., a speculative pre-fetch is made to read data from the memory associated with the memory controller. If the speculative fetch turns out to be correct, then the memory controller makes an assumption that the pre-fetch was too conservative (not highly speculative), and a pre-fetch for a next data request is performed at an earlier more speculative time. If the speculative fetch turns out to be incorrect, then the memory controller makes an assumption that the pre-fetch was too speculative (made too early), and a pre-fetch for a next data request is performed at a later less speculative time.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, where:

FIG. 6 is a flow-chart describing speculative pre-fetches of data from system memory based on parameters in the transaction described in FIG. 5a.

DETAILED DESCRIPTION OF A PREFERRED EMBODIMENT

Figure 1:
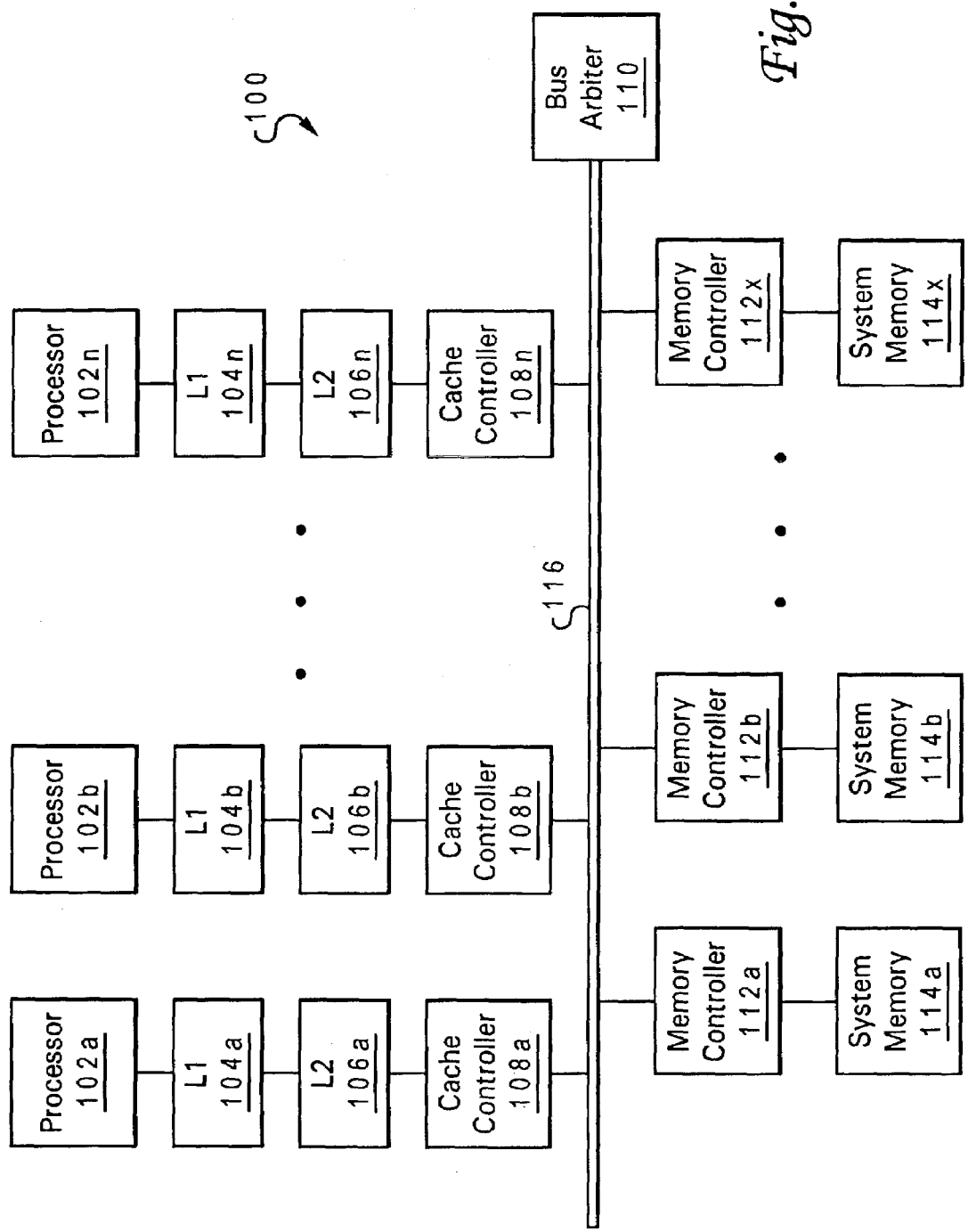
FIG. 1 depicts a block diagram of a prior art multi-processor computer system.
Figure 3:
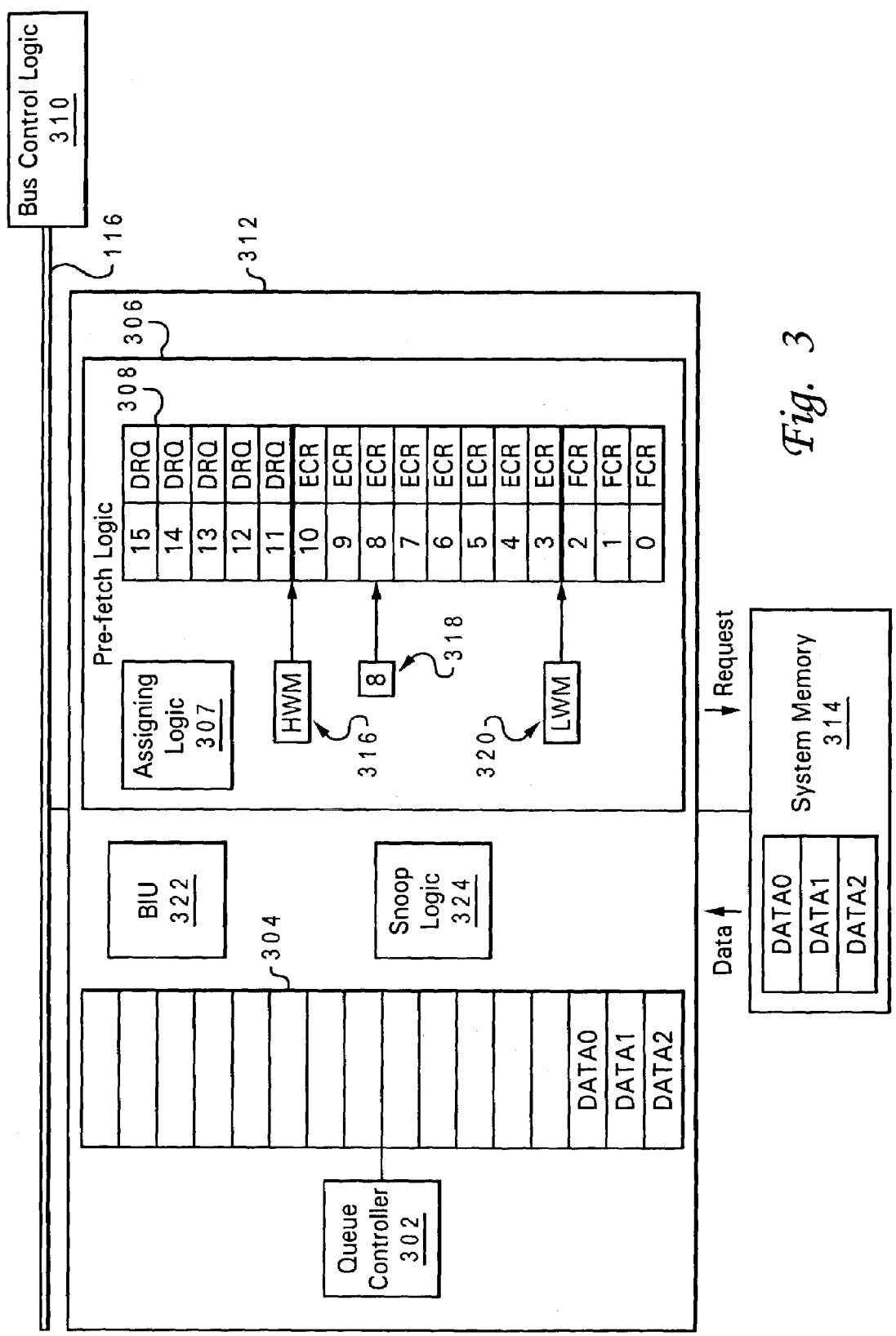
FIG. 3 depicts a preferred embodiment of a memory controller used in the present invention.

With reference now to FIG. 3, there is illustrated an exemplary embodiment of a memory controller 312 for use with the present invention. Although only a single memory controller 312 and associated system memory 314 are illustrated, it is understood that in a preferred embodiment memory controller 312 and system memory 314 make up one pair of multiple memory/memory controller pairs connected to a interconnect such as exemplary data bus 116 in a computer system, having multiple processors with respective caches (now shown in FIG. 3, but substantially similar to the processors and cache/cache controllers shown in FIG. 1) coupled to an interconnect such as exemplary data bus 116.

Memory controller 312 includes a bus interface 322, which provides an interface with an interconnect, which in a preferred embodiment is data bus 116. Note that while data bus 116 is used as an exemplary interconnect, such an interconnect may be a switch, bus or other interconnect known to those skilled in the art for providing a means of communication among processors, memories, caches, and controllers. Memory controller 312 also includes a snoop logic 324, which detects the presence of data requests as well as responses on data bus 116. These responses include combined responses from cache controllers and other memory controllers as well as early combined responses and final combined responses generated by a bus control logic 310. Bus control logic 310 is an exemplary means for issuing data requests and response signals onto data bus 116. Exemplary response signals include but are not limited to signals signifying a data request has been issued, an early combined response to the data request and a final combined response to the data request, as described above. A request for data stored in system memory 314 is sent from memory controller 312, and the result returned to a data queue 304, which is under the control of a queue controller 302. As illustrated, data queue 304 in a preferred embodiment is a First In First Out (FIFO) memory queue, but may be any type of register, stack or queue configuration desired by the implementer of the present invention.

The request for data from memory controller 312 to system memory 314 may be a speculative pre-fetch or a "non-speculative" fetch. That is, the data request may be made before memory controller 312 "knows," as described below, that a data fetch is actually required from the system memory 314 associated with the specific memory controller 312, or the request may be made when memory controller 312 has confirmed that the data from system memory 314 is required to satisfy the data request, and thus returned to the data bus 116.

If the data fetch is performed after a final combined response is returned, as shown and described above in FIG. 2, then the fetch is non-speculative. However, if the data fetch is performed before the final combined response is returned, such as when the data request is first broadcast on data bus 116 by a bus control logic 310, or when bus control logic 310 broadcasts an early combined response, then the data pre-fetch is speculative.

In a preferred embodiment of the present invention, the determination as to when the data fetch is made is according to an up-down pointing counter 318, which acts in a preferred embodiment as a counting logic and a position counter that points to a line in an array 308 that has values in an upper first range, middle second range, and lower third range of numbers. Assignment of ranges to different signals from bus control logic 310, such as data requests (DRQ), early combined responses (ECR) and final combined responses (FCR) are preferably performed by an assigning logic 307. Up-down pointing counter 318 is illustrated pointing to a stored value "8," which can dynamically change as described below.

Figure 2:
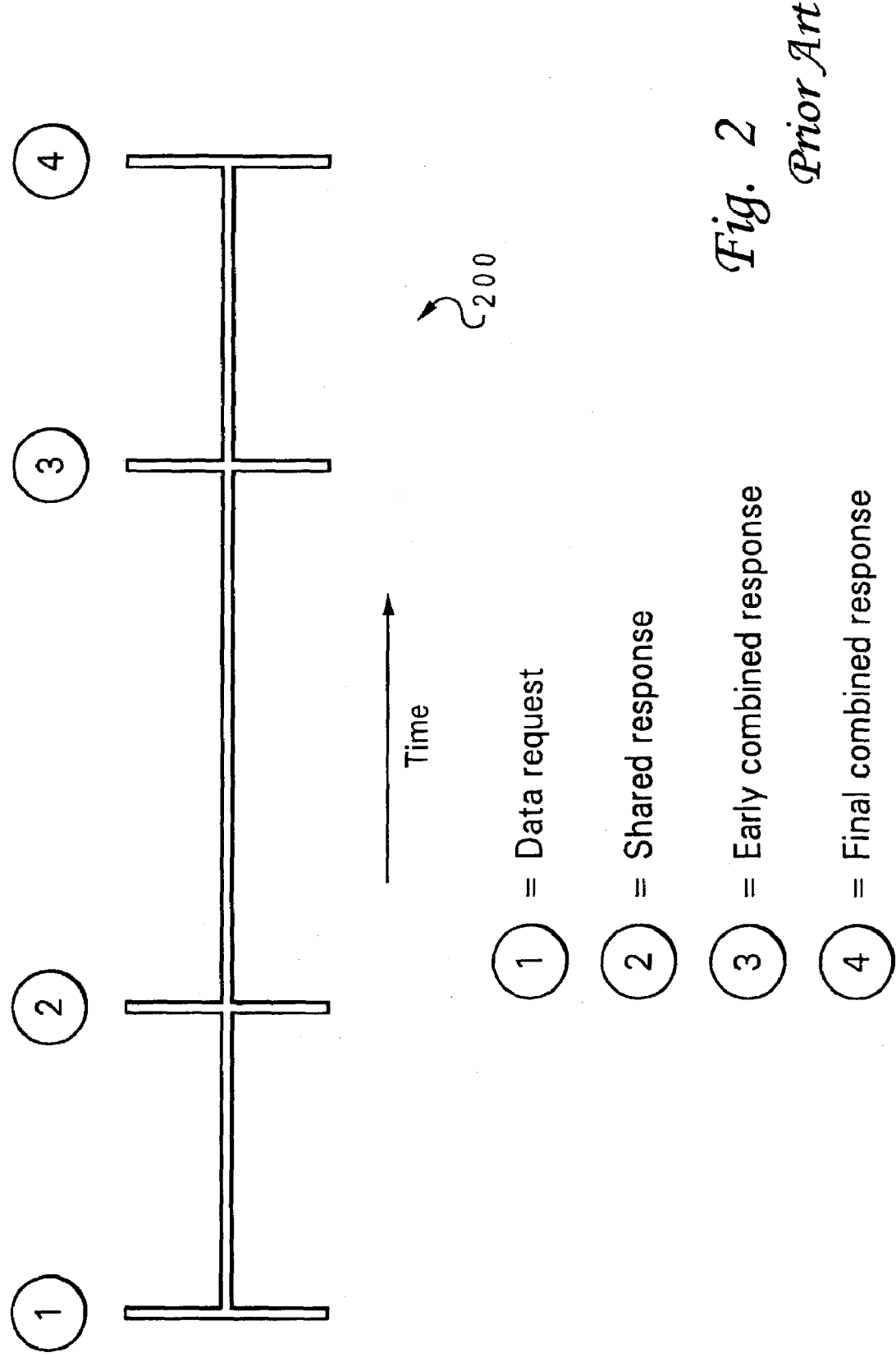
FIG. 2 illustrates a timeline for data requests and responses.

Up-down pointing counter 318 is used as a pointer to allow a speculation logic and fetching logic, shown in an exemplary form as a pre-fetch logic 306, the ability to determine when in time to speculatively (or non-speculatively) make a data request fetch from system memory 314. If the current position/value of up-down pointing counter 318 is greater than a high water mark (HWM) 316, which divides a range of numbers associated with data requests (DRQ) from a range of numbers associated with early combined responses (ECR), then a speculative pre-fetch of data from system memory 114 is made at the time of the DRQ. That is, if up-down pointing counter 318 has a value between 11 and 15, then the pre-fetch of memory data is performed at the time of the DRQ, shown as event (1) in FIG. 2. If the up-down pointing counter has a value between 3 and 10, then the speculative pre-fetch is performed when the ECR, shown as event (3) in FIG. 2, issued by bus control logic 310 is detected by memory controller 312. If the up-down pointing counter has a value between 0 and 2, then the up-down pointing counter 318 is below the low water mark (LWM) 320, which divides the range of values for ECR from a range of numbers associated with a final combined response (FCR), shown as event (4) in FIG. 2. A memory data fetch at the time of a FCR is non-speculative, as it is performed after the FCR is issued by bus control logic 310.

All values associated with DRQ, ECR and FCR in FIG. 3 are illustrative examples only, and in the preferred embodiment of the present invention can be dynamically changed. That is, based on post-manufacturing data or other engineering results, the HWM and LWM, showing break-points for when a speculative or non-speculative pre-fetch is performed, may be dynamically adjusted according to past performance models, future prediction models of software/hardware, etc. Also, the number of values (16) may vary, as may the criteria themselves (DRQ, ECR, FCR), as determined by various events in a data request cycle.

Figure 4:
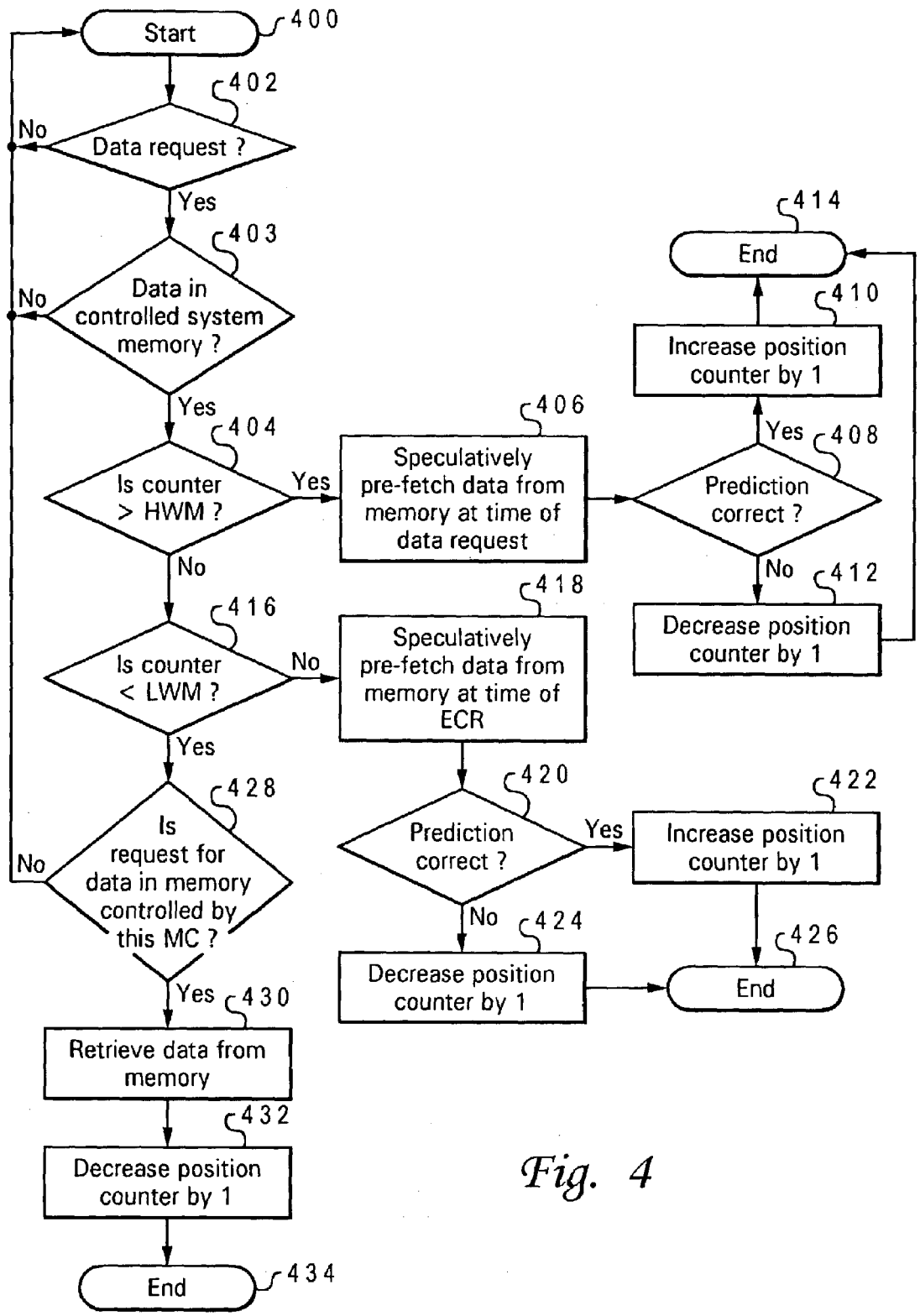
FIG. 4 is a flow-chart showing steps taken in the present invention for speculatively pre-fetching data from a system memory according to a past history of pre-fetch successes.

Referring now to FIG. 4, there is depicted a flow-chart for utilizing an up-down position counter in speculatively pre-fetching data from a system memory. First, a determination is made at decision block 402 that a snoop logic 324 has detected a data request on data bus 116. After determining that the request is for data at an address controlled by memory controller 312 (decision block 403), a determination is made regarding the position/value of up-down position counter 318. If the up-down pointing counter 318 is greater than HWM 316, then the data is speculatively fetched from system memory at the time of the initial data request (block 406). At a later event (final combined response), memory controller 312 is notified as to whether data from the system memory 114 associated with memory controller 312 is in fact needed to satisfy the data request. If so, then the prediction and speculative pre-fetch were correct, and up-down pointing counter 318 is increased by one (blocks 408 and 410). By increasing the up-down pointing counter 318 by one, then the next speculative pre-fetch will also be performed at the time of the DRQ, since the up-down pointing counter is still above HWM 314. However, if the prediction is wrong, then the speculative pre-fetch was unnecessary, and the up-down pointing counter 318 is decreased by one (block 412), and the process is ended (terminator 414). Referring to FIG. 3 again, if the up-down pointing counter 318 had been initially pointing to "11", then decreasing the value by one to "10" will result in the next speculative pre-fetch being performed at the time of an ECR. However, if the up-down pointing counter 318 had been pointing to "12", then decreasing the value to "11" will result in the next speculative pre-fetch still being performed at the time of the DRQ.

If the up-down pointing counter 318 contains a value that is below low water mark (LWM) 320 (decision block 416), then a query (decision block 428) is made as to whether the data request is for data at an address within the range of addresses within the system memory 314 controlled by memory controller 312. If not, then no further action is taken, and memory controller 312 waits for the next data request (back to initiator 400). If the request is for data stored in system memory 314, then the data is retrieved (block 430), and the up-down pointing counter 318 is decreased by one (block 432), assuming that the value stored in up-down pointing counter 318 is not already zero, in which case the value stored in the up-down pointing counter 318 is left unchanged.

If the up-down pointing counter 318 contains a value that is not less than LWM 320 (decision block 416), then data is speculatively pre-fetched from system memory 314 at the time of an ECR (block 418). If the speculative pre-fetch is correct, the up-down pointing counter 318 is increased by one (block 422), or decreased by one (block 424) if the speculation was incorrect. Thus, if the up-down pointing counter 318 contained a value of "3", then the next speculative pre-fetch would be during a next ECR (since new value="4") if the prediction was correct, and would wait for the next FCR (since new value="2") if the prediction was incorrect. Again, it is noted that the values for LWM 320, HWM 316, and the parameters themselves (DRQ, ECR, FCR) are exemplary, and may be varied to other values and parameters within the context of the present invention.

By dynamically adjusting the value in the up-down pointing counter 318, the present invention is able to adjust to series of hits or misses on a specific system memory 314. That is, if a series of data requests turn out to be for data in system memory 314 associated with the specific memory controller 312, then the present system and method promotes early speculation (such as at DRQ or ECR), so that the data is available in data queue 304 at or near the time of FCR. Conversely, if a series of data requests are not for data at a specific system memory 314, then speculative pre-fetches are avoided, thus conserving resources.

Figure 5A:
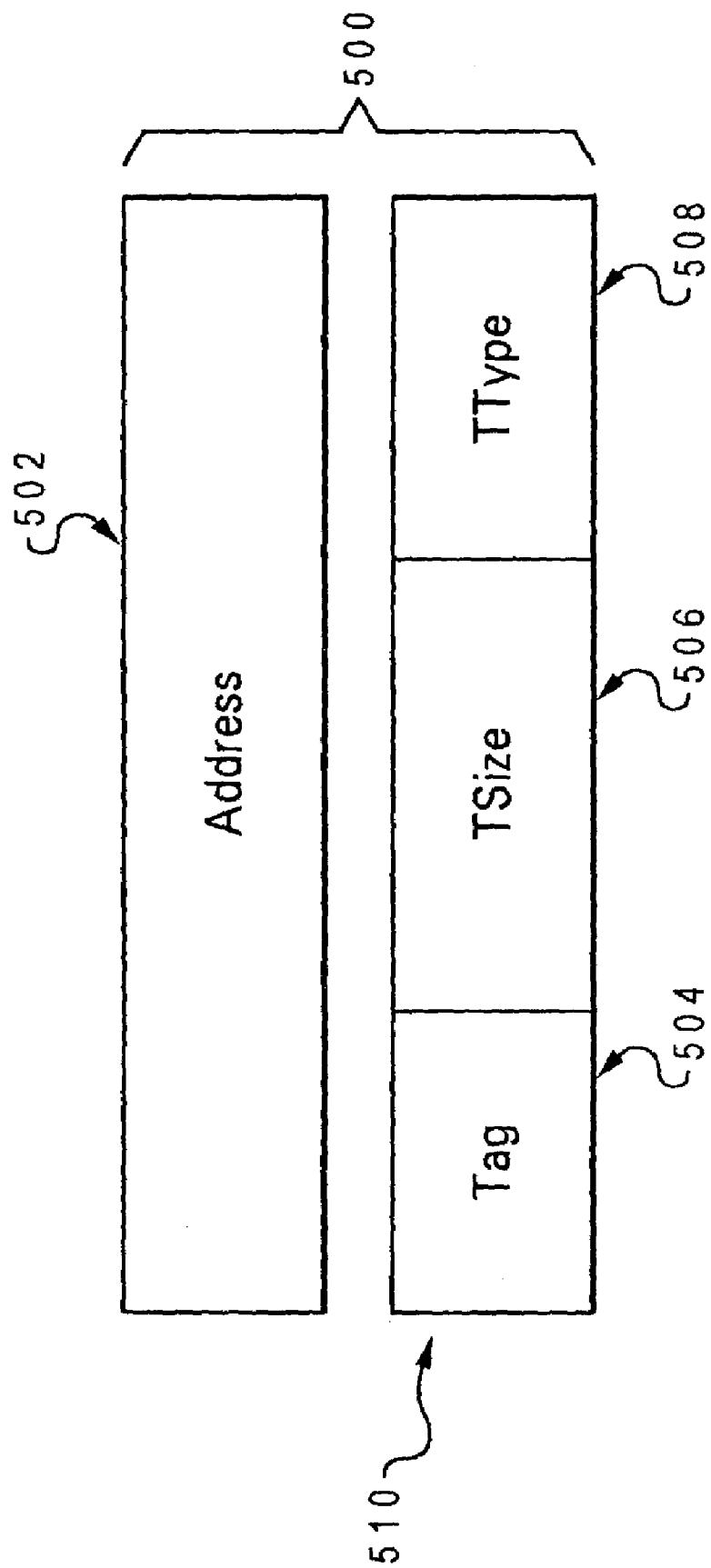
FIG. 5a illustrates a transaction describing a data request.
Figure 5B:
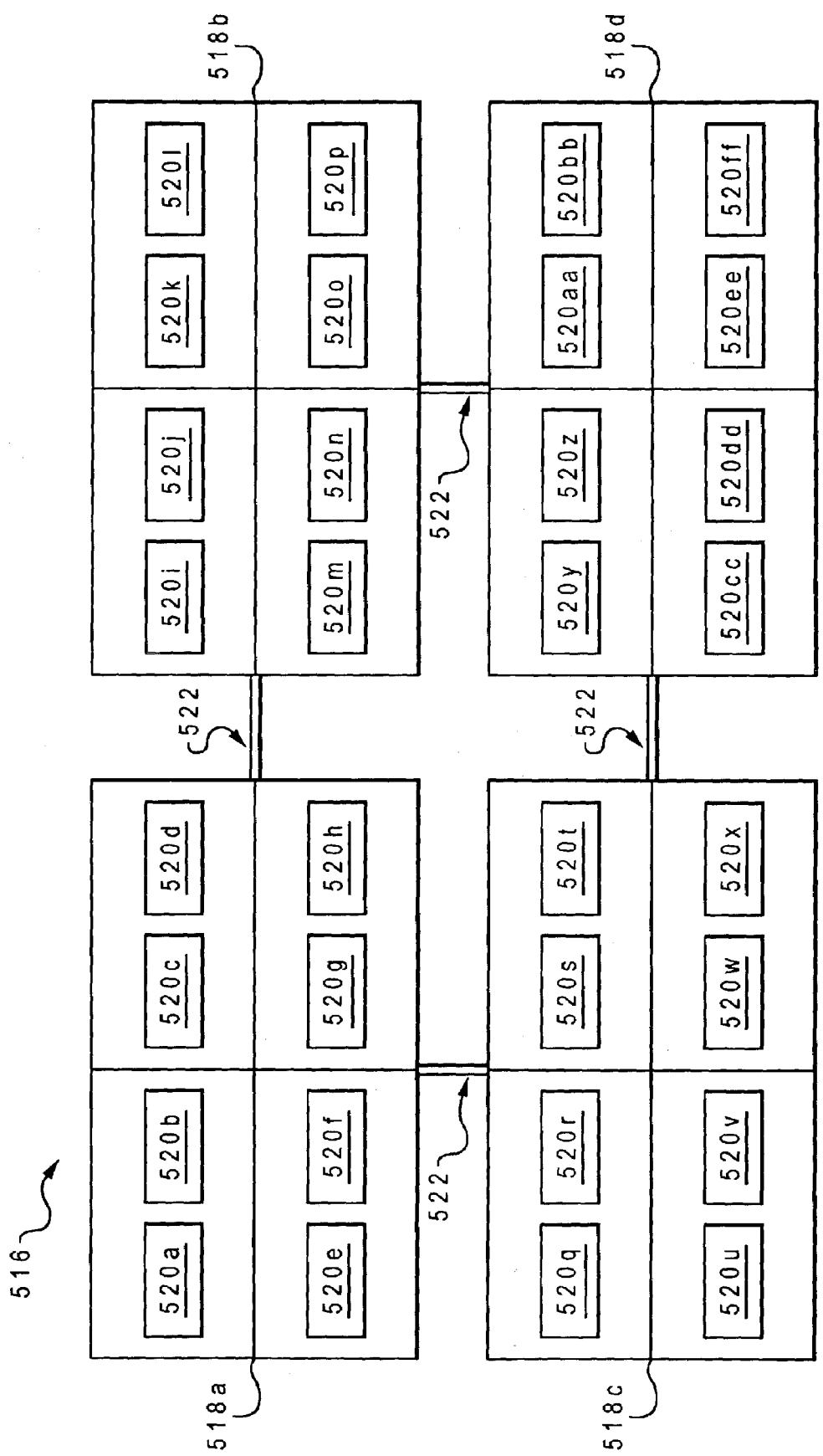
FIG. 5b describes a multi-processor computer showing different interconnects between subsystems in the computer.

With reference now to FIG. 5a, there is depicted a block diagram of information in a data request's transaction 500. Transaction 500 includes both an address block 502 and a header 510. The address block 502 contains the physical address of the data being requested by the bus control logic over the data bus. Header 510 contains other information about the request, including a tag 504, a TSize 506, and a TType 508. Tag 504 is unique to transaction 500, and includes an identification of the original source of the data request (such as a specific processor), as well as the history of all places where the data request has traveled. For example, consider a multi-processor system 516 such as shown in FIG. 5b. Multi-processor system 516 is a 32-way multi-processor, having 32 processors 520 arranged in pairs that are used to form four eight-processor nodes 518. Connecting the eight-processor nodes 518 are interconnects 522, which are much slower than internal interconnects (not shown) connecting processors 520 within a same eight-processor node 518. Because of the relative speed differences between the internal interconnects and the external interconnects 522, engineers try to develop software that keeps cached memory within a same node 518. Thus, if a data request comes to node 518d from 518a, as revealed by tag 504, then there is a likelihood that if node 518d has the data, it will be in a system memory and not a cache. Therefore, memory controller 312 speculatively pre-fetches the data at a time before FCR described above. This speculative pre-fetch may be made either with or without the decision process described above in FIG. 4.

Likewise, speculative pre-fetches may be made based on other header information, including TSize 506 and TType 508. TSize 506 describes the size of the data block being requested, and is useful in predicting whether such a size of data is likely to be cached, or is still in system memory. Likewise, information found in TType 508 can be useful in predicting whether the requested data is in a cache or only in system memory. Examples of TType 508 are "Read L2 M" ("read a modified data in an L2 cache, if available"), "Read L2 S" ("read a shared data in an L2 cache, if available"), "DMA Read" ("direct memory address read"), etc. The TType 508 gives the software engineer a hint as to whether the data will likely be stored in a cache or a system memory, which allows the engineer to adjust how speculative the memory controller 312 should be in pre-fetching data from system memory 314.

Figure 6:
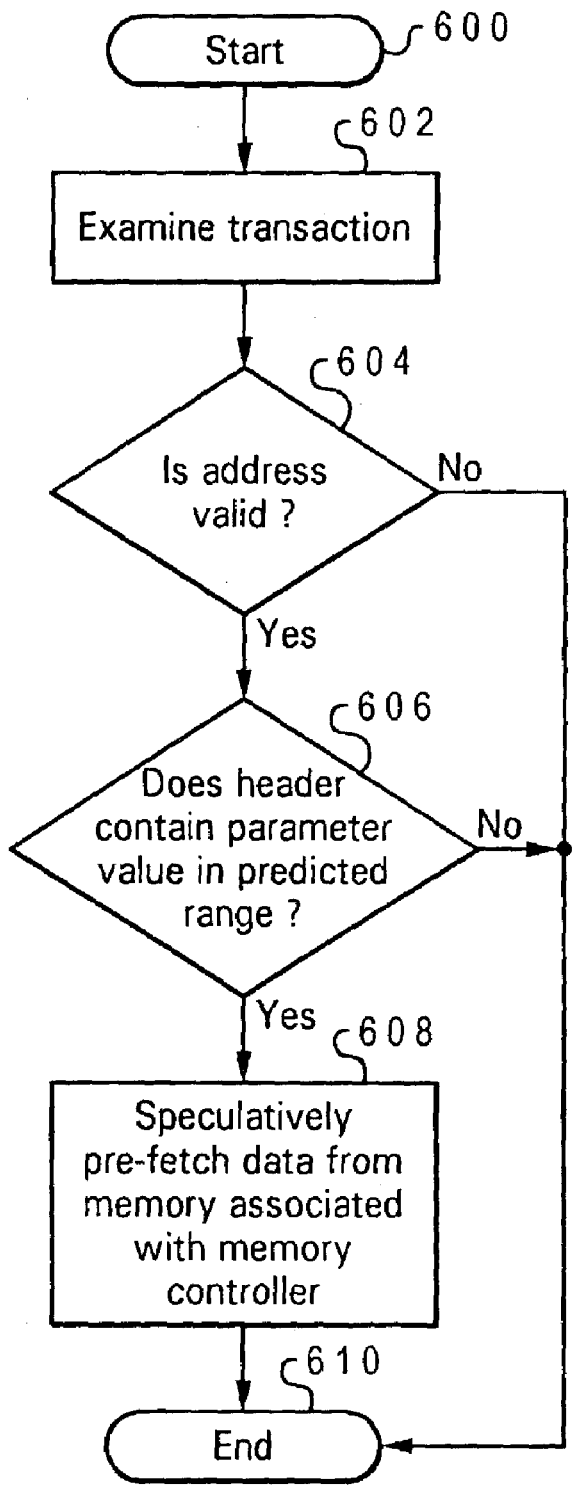

Referring now to FIG. 6, a flow-chart is presented showing a high-level description of the use of header information for speculative pre-fetches of data from system memory. Starting at initiator block 600, a transaction in a data request is examined (block 602). If the address is valid for the system memory associated with the memory controller examining the transaction (decision block 604), a query is made as to whether the header contains a parameter value in a predicted range (block 606). For example, the memory controller may examine the TType block of the header, and determine whether the request is a DMA data request. If so, then that TType may fit within the predicted range (or type) of requests wherein the system memory will likely have to ultimately provide the requested data, rather than a cache memory. The data is then speculatively pre-fetched (block 608), and the process ends (terminator block 610).

It is noted that the methods described in FIG. 4 and FIG. 6 may be utilized separately or in combination. That is, the information in a transaction referenced in FIG. 6 may be used to modify (statically or dynamically) the speculation parameters described in FIG. 4, and likewise the speculation parameters described in FIG. 4 may be used to modify the system described in FIG. 6.

Figure 7:
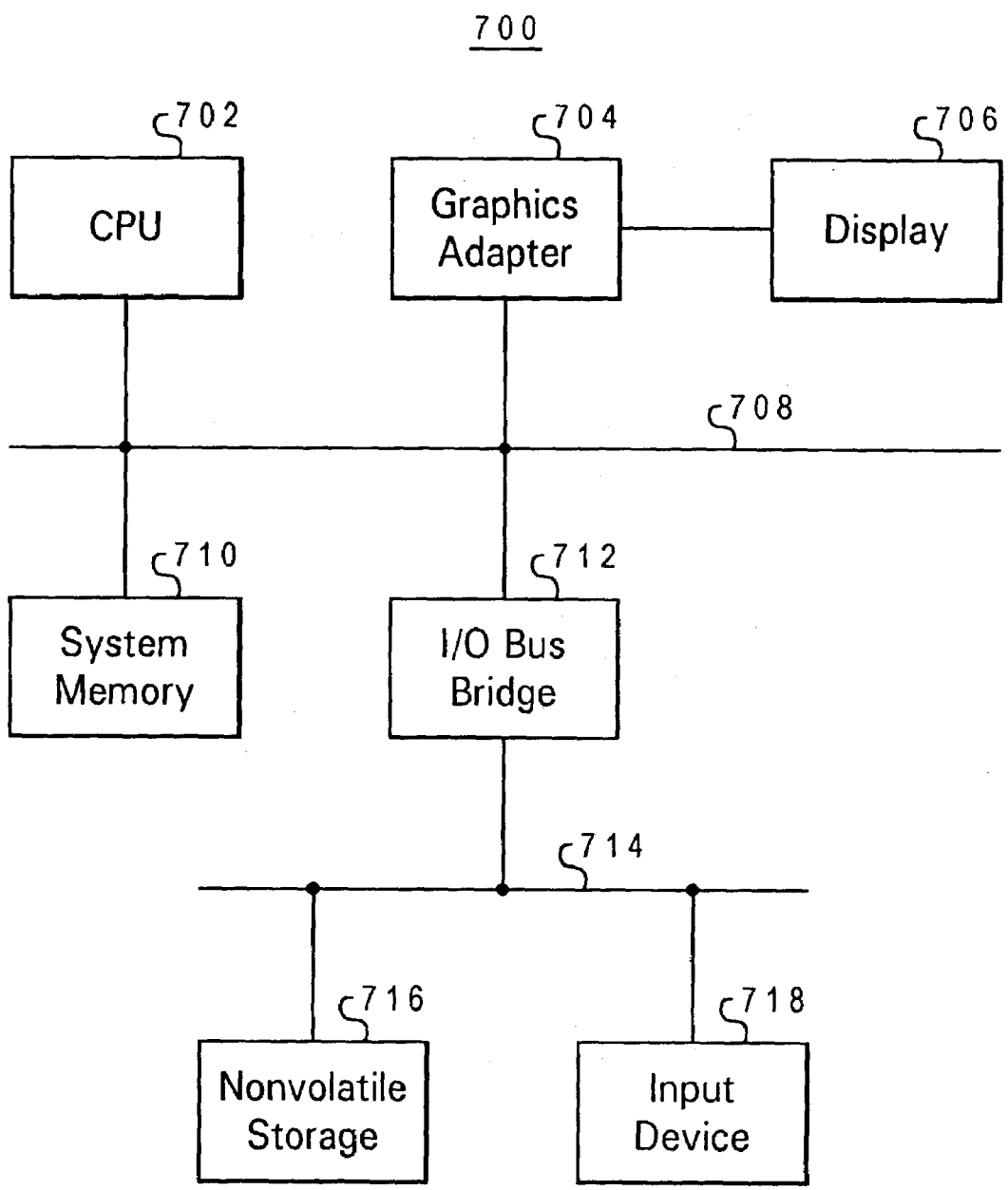
FIG. 7 illustrates a processor logic used in a preferred embodiment of the present invention to adjust an up-down pointing counter used in the present invention.

With reference now to FIG. 7, there is depicted a block diagram of a data processing system 700 in which a preferred embodiment of the present invention may be implemented. Data processing system 700 may be used as an assigning logic to dynamically load values in array 308 indicating which stage in a snoop process (e.g., DRQ, ECR, FCR) is associated with a value in up-down pointing counter 318. Alternatively, an assigning logic 307 (shown in FIG. 3)

for loading values in array 308 may be incorporated into or associated with pre-fetch logic 306. Likewise data processing system 700 may be used to perform the function of the counting logic associated with adjusting the value of up-down pointing counter 318. Data processing system 700 may be, for example, one of the models of personal computers available from International Business Machines Corporation of Armonk, N.Y. Data processing system 700 includes a central processing unit (CPU) 702, which is connected to a system bus 708. In the exemplary embodiment, data processing system 700 includes a graphics adapter 704 also connected to system bus 708, for providing user interface information to a display 706.

Also connected to system bus 708 are a system memory 710 and an input/output (I/O) bus bridge 712. I/O bus bridge 712 couples an I/O bus 714 to system bus 708, relaying and/or transforming data transactions from one bus to the other. Peripheral devices such as nonvolatile storage 716, which may be a hard disk drive, and input device 718, which may include a conventional mouse, a trackball, or the like, is connected to I/O bus 714.

The exemplary embodiment shown in FIG. 7 is provided solely for the purposes of explaining the invention and those skilled in the art will recognize that numerous variations are possible, both in form and function. For instance, data processing system 700 might also include a compact disk read-only memory (CD-ROM) or digital video disk (DVD) drive, a sound card and audio speakers, and numerous other optional components. All such variations are believed to be within the spirit and scope of the present invention.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such single-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A system for speculatively timing a fetching of data from a memory, said system comprising:
   multiple processors with respective caches coupled to an interconnect;
   a memory controller coupled between said interconnect and a memory;
   means for issuing data requests on said interconnect; and
   a speculation logic associated with said memory controller, said speculation logic including:
      logic means for examining a data request issued on said interconnect, and
      logic means for dynamically varying a prefetch time for a next data request responsive to examining said data request,
   wherein an early response to the data request is a shared response indicating that said interconnect is busy or has valid data available, a later response to the data request is a combined response indicating a prediction as to where requested data is located, and a still later response to the data request is a final combined response confirming if a cache controller has control and access to the requested data.

2. The system of claim 1, wherein said logic means for dynamically varying said prefetch time is based on a history of previous fetches of data from said memory.

3. A system for speculatively timing a fetching of data from a memory, said system comprising:
   multiple processors with respective caches coupled to an interconnect;
   a memory controller coupled between said interconnect and a memory;
   means for issuing data requests on said interconnect, wherein said interconnect is a bus, and wherein said means for issuing data requests is a bus arbiter; and
   a speculation logic associated with said memory controller, said speculation logic including:
      logic means for examining a data request transaction of a data request issued by said means for issuing data requests;
      logic means for determining that at least one non-address parameter in a header of said data request transaction contains a value within a pre-determined range, and
      logic means for, upon a determination that said at least one non-address parameter in said header of said data request transaction contains a value within said pre-determined range, speculatively fetching data from said memory in response to an early response by said means for issuing data requests, wherein a response to said data request is an early combined response.

4. The system of claim 3, further comprising:
   an assigning logic for assigning a first range of numbers corresponding to said data request, a second range of numbers corresponding to said early combined response, and a third range of numbers corresponding to a final combined response;
   an up-down pointing counter initialized with a value in said first range, said second range, or said third range of numbers;
   a fetching logic for speculatively fetching said data upon said data request, said early combined response or said final combined response according to said value in said up-down pointing counter; and
   a counting logic, responsive to a current speculative pre-fetch providing a requested data upon a final combined response from said bus arbiter, for adjusting said value in said up-don pointing counter towards said first range of numbers, wherein a next speculative pre-fetch of data from said memory is likely to be more speculative than said current speculative pre-fetch, and said counting logic, responsive to said data not being ultimately provided upon said final combined response from said bus arbiter, adjusting said value in said up-down pointing counter towards said third range of numbers, wherein said next speculative pre-fetch is more likely to be less speculative than said current speculative pre-fetch.

5. The system of claim 3, wherein said at least one non-address parameter is a tag.

6. The system of claim 3, wherein said at least one non-address parameter is a transaction size.

7. The system of claim 3, wherein said at least one non-address parameter is a transaction type.

8. The system of claim 3, further comprising an address logic for determining that said data request transaction references a valid address in said memory.

9. A method of speculatively timing a fetching of data from a memory, said method comprising:
   examining, at a memory controller, a data request on an interconnect; and
   dynamically varying a prefetch time for a next data request responsive to examining said data request,
wherein an early response to the data request is a shared response indicating that said interconnect is busy or has valid data available, a later response to the data request is a combined response indicating a prediction as to where requested data is located, and a still later response to the data request is a final combined response confirming if a cache controller has control and access to the requested data.

10. The method of claim 9, wherein said dynamically varying said prefetch time is based on a history of previous fetches of data from said memory.

11. A method of speculatively timing a fetching of data from a memory, said method comprising:
   examining, at a memory controller, a data request transaction of a data request from an interconnect, said memory controller including means for issuing data requests on said interconnect, and said memory controller having access to a memory, wherein said interconnect is a bus and said means for issuing data requests is a bus arbiter;
   determining that at least one non-address parameter in a header of said data request transaction contains a value within a pre-determined range; and
   upon a determination that said at least one non-address parameter in said header of said data request transaction contains said value within said pre-determined range, speculatively fetching data from said memory in response to an early response from said means for issuing data requests, wherein a response to said data request is an early combined response.

12. The method of claim 11, further comprising:
   assigning a first range of numbers corresponding to said data request, a second range of numbers corresponding to said early combined response, and a third range of numbers corresponding to a final combined response;
   initializing an up-down pointing counter with a value in said first range, said second range, or said third range of numbers;
   fetching said data upon said data request, said early combined response or said final combined response according to said value in said up-down pointing counter;
   if a current speculative pre-fetch provides a requested data upon a final combined response from said bus arbiter, then adjusting said value in said up-down pointing counter towards said first range of numbers, wherein a next speculative pre-fetch of data from said memory is likely to be more speculative that said current speculative pre-fetch; and
   if said data is not ultimately provided upon said final combined response from said bus arbiter, then adjusting said value in said up-down pointing counter towards said third range of numbers, wherein said next speculative pre-fetch is more likely to be less speculative that said current speculative pre-fetch.

13. The method of claim 11, wherein said at least one non-address parameter is a tag.

14. The method of claim 11, wherein said at least one non-address parameter is a transaction size.

15. The method of claim 11, wherein said at least one non-address parameter is a transaction type.

16. The method of claim 11, further comprising determining that said data request transaction contains a valid address for said memory.

17. A system for speculatively timing a fetching of data from a memory, said system comprising:
   multiple processors with respective caches coupled to an interconnect;
   a memory controller coupled between said interconnect and a memory;
   means for issuing data requests on said interconnect; and
   a speculation logic associated with said memory controller, said speculation logic including:
      logic means for examining a data request issued on said interconnect,
      logic means for dynamically varying a prefetch time for a next data request responsive to examining said data request,
      logic means for examining a data request transaction of a data request issued by said means for issuing data requests
      logic means for determining that at least one non-address parameter in a header of said data request transaction contains a value within a pre-determined range, and
      logic means for, upon a determination that said at least one non-address parameter in said header of said data request transaction contains a value within said pre-determined range, fetching a speculative data from said memory in response to a pre-determined action by said bus arbiter.

18. The system of claim 17, further comprising:
   an assigning logic for assigning a first range of numbers corresponding to said data request, a second range of numbers corresponding to said early combined response, and a third range of numbers corresponding to a final combined response;
   an up-down pointing counter initialized with a value in said first range, said second range, or said thud range of numbers;
   a fetching logic for speculatively fetching said data upon said data request, said early combined response, or said final combined response according to said value in said up-down pointing counter; and
   a counting logic, responsive to a current speculative pre-fetch providing a requested data upon a final combined response from said bus arbiter, for adjusting said value in said up-down pointing counter towards said first range of numbers, wherein a next speculative pre-fetch of data from said memory is likely to be more speculative than said current speculative pre-fetch, and said counting logic, responsive to said data not being ultimately provided upon said final combined response from said bus arbiter, adjusting said value in said up-down pointing counter towards said third range of numbers, wherein said next speculative pre-fetch is more likely to be less speculative than said current speculative pre-fetch.

19. A computer program product, residing on a computer usable medium, for speculatively timing the fetching of data from a memory, said computer program product comprising:
  program code for examining, at a memory controller, a data request on an interconnect; and
  program code for dynamically varying a prefetch time for a next data request responsive to examining said data request;
  program code for examining, at a memory controller, a data request transaction of a data request from an interconnect, memory controller and said a means for issuing data requests being connected to said interconnect, said memory controller having access to a memory;
  program code for determining that at least one non-address parameter in a header of said data request transaction contains a value within a pre-determined range; and
  program code for, upon a determination that said at least one non-address parameter in said header of said data request transaction contains said value within said pre-determined range, fetching a speculative data from said memory in response to an early response from said means for issuing data requests.

20. The computer program product of claim 19, wherein said dynamically varying said prefetch time is based on a history of previous fetches.

21. The computer program code of claim 19, further comprising:
  computer program code for assigning a first range of numbers corresponding to said data request, a second range of numbers corresponding to said early combined response, and a third range of numbers corresponding to a final combined response;
  computer program code for initializing an up-down pointing counter with a value in said first range, said second range, or said third range of numbers;
  computer program code for fetching said data upon said data request, said early combined response or said final combined response according to said value in said up-down pointing counter;
  computer program code for, if a current speculative pre-fetch provides a requested data upon a final combined response from said bus arbiter, then adjusting said value in said up-down pointing counter towards said first range of numbers, wherein a next speculative pre-fetch of data from said memory is likely to be more speculative that said current speculative pre-fetch; and
  computer program code for, if said data is not ultimately provided upon said final combined response from said bus arbiter, then adjusting said value in said up-down pointing counter towards said third range of numbers, wherein said next speculative pre-fetch is more likely to be less speculative that said current speculative pre-fetch.

22. The system of claim 17, wherein an early response to the data request is a shared response indicating that said interconnect is busy or has valid data available, a later response to the data request is a combined response indicating a prediction as to where requested data is located, and a still later response to the data request is a final combined response confirming if a cache controller has control and access to the requested data.

23. The computer program product of claim 19, wherein an early response to the data request is a shared response indicating that said interconnect is busy or has valid data available, a later response to the data request is a combined response indicating a prediction as to where requested data is located, and a still later response to the data request is a final combined response confirming if a cache controller has control and access to the requested data.

* * * * *

UNITED STATES PATENT AND TRADEMARK OFFICE
CERTIFICATE OF CORRECTION

PATENT NO. : 7,058,767 B2
APPLICATION NO. : 10/425400
DATED : June 6, 2006
INVENTOR(S) : Dodson et al.

It is certified that error appears in the above-identified patent and that said Letters Patent is hereby corrected as shown below:

In Claim 18, at column 10, line 46, delete "thud" and insert --third--.

In Claim 19, at column 11, line 11, between "interconnect," and "memory" insert --said--.

Signed and Sealed this

Fifth Day of December, 2006

JON W. DUDAS
*Director of the United States Patent and Trademark Office*